3,522,987
MULTIPLE POSITION REAR VIEW MIRROR
Walter J. Janosky, Springdale, and Robert W. Pflaum, Pittsburgh, Pa., assignors to Libbey-Owens-Ford Glass Company, Toledo, Ohio, a corporation of Ohio
Filed Oct. 9, 1967, Ser. No. 673,695
Int. Cl. G02b 17/00
U.S. Cl. 350—281
8 Claims

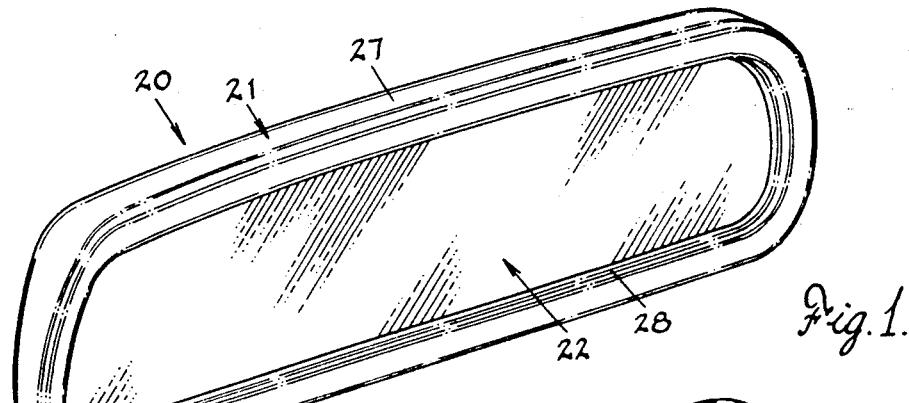
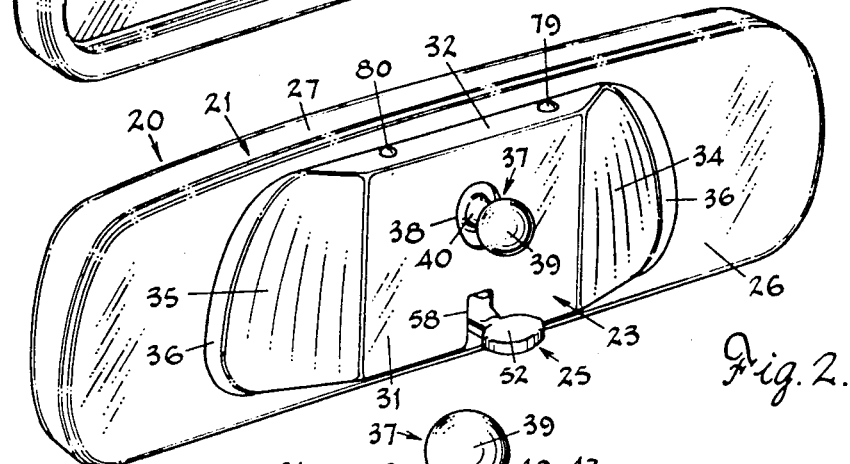
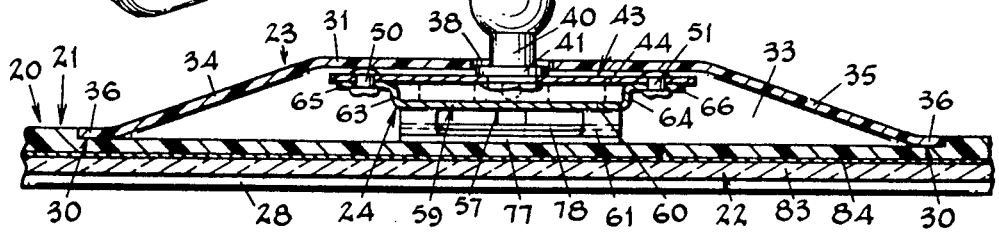
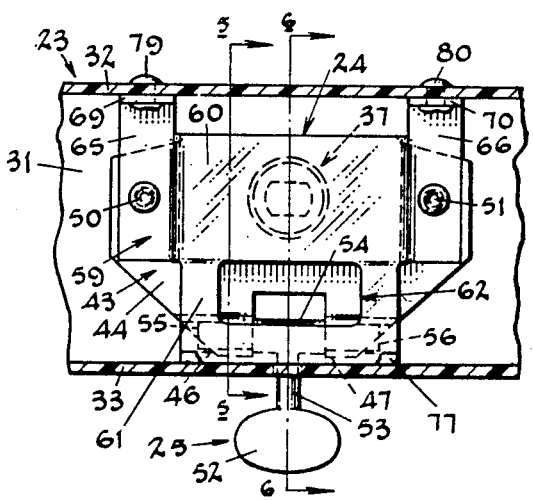
Aug. 4, 1970     W. J. JANOSKY ET AL     3,522,987
MULTIPLE POSITION REAR VIEW MIRROR
Filed Oct. 9, 1967     2 Sheets-Sheet 1
INVENTORS
Walter J. Janosky and
Robert W. Pfeaum
BY Collins & Oberlin
ATTORNEYS INVENTORS
Walter J. Janosky and
Robert W. Pfeaum
BY
Collins & Oberlin
ATTORNEYS

United States Patent Office 3,522,987
Patented Aug. 4, 1970

ABSTRACT OF THE DISCLOSURE

A multiple position rear view mirror for automotive vehicles which can be readily adjusted to provide a high intensity reflection and a lower intensity reflection. The mirror comprises a case carrying a mirror element and a housing at the back of the case in which the actuating mechanism for adjusting the mirror is mounted, said case and housing being formed of a molded plastic material. The actuating mechanism is carried by a support member secured in fixed relation to the vehicle, and comprises spring hinge means secured to the support member and to the housing and manually operable means including a cam and a finger lever for actuating said spring hinge means to move the housing and mirror element as a unit from one reflecting position to another.

---

Figure 6:
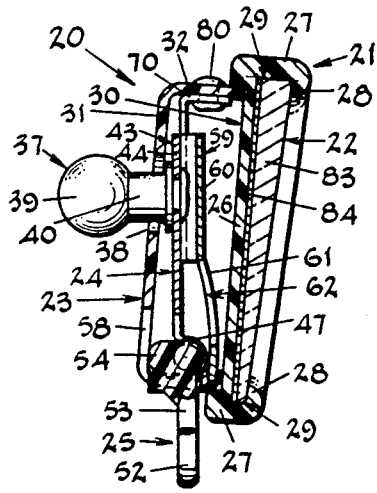

The present invention relates generally to rear view mirrors for automotive vehicles or the like, and more particularly to so-called multiple position mirrors in which the reflecting mirror element or panel can be moved from one position to another to provide a high intensity reflection or a lower intensity reflection.

One hazard in driving an automobile upon roads at night is the glare from headlights from cars behind that of the driver, which glare is often, and at times unexpectedly, reflected into the eyes of the driver by the rear view mirror conventionally mounted interiorly of the car adjacent the upper or lower edge of the windshield. A single mirror has been developed having both a high intensity reflection for day driving and a low intensity reflection for night driving. Such low intensity reflection substantially reduces headlight glare from following cars, thereby decreasing the hazard of a blinding effect of the glare and correspondingly increasing the safety and ease with which the vehicle may be handled.

The intensity of the reflection reflected by the rear view mirror to the eyes of the driver is dependent upon the position of and the angle at which the light from the headlights from following cars strikes the mirror.

An object of the invention, therefore, is to provide a multiple intensity rear view mirror which can be easily and conveniently adjusted to either one of two reflecting positions.

Another object of the invention is to provide such a rear view mirror which includes a prismoidal reflecting mirror element or panel and improved actuating mechanism for tilting the mirror element from one reflecting position to another.

Another object of the invention is to provide improved actuating mechanism for effecting a smooth yet positive tilting of the mirror element to either of its reflecting positions and for locking it in such position without disturbing the setting of the mirror as a whole or altering the driver's view of the road conditions to the rear of the vehicle.

A further object of the invention is to provide a rear view mirror having improved safety characteristics in that the mirror case is of a molded plastic material and is devoid of sharp edges or corners which could result in injury to the driver or passengers on impact.

Other objects and advantages of the invention will become more apparent during the course of the following description when taken in connection with the accompanying drawings.

Figure 5:
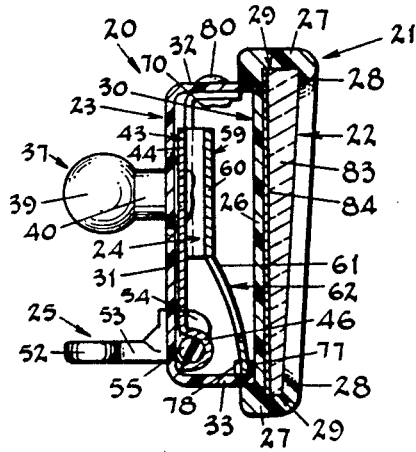
Figure 7:
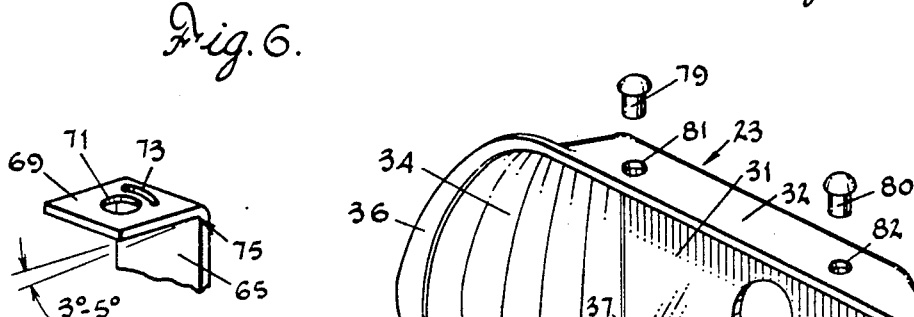
Figure 8:
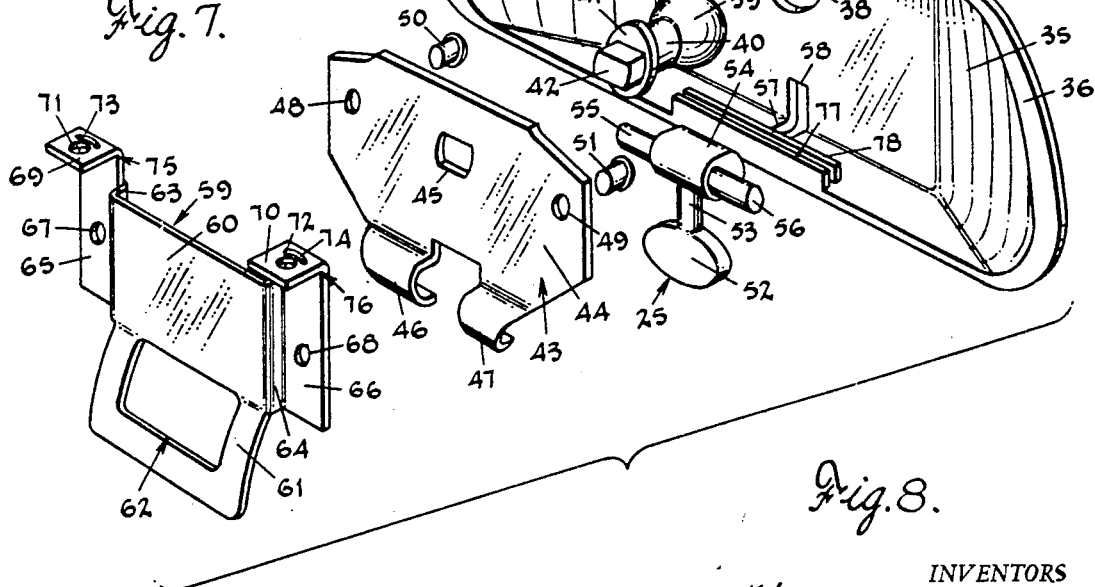

In the drawings wherein like numerals are employed to designate like parts through the same:

FIG. 1 is a perspective front view of a rear view mirror constructed in accordance with the invention, FIG. 2 is a perspective view of the mirror looking at the back thereof, FIG. 3 is a longitudinal section through the mirror including the actuating mechanism, FIG. 4 is a front view of the mirror with the reflecting element removed to show the actuating mechanism, FIG. 5 is a vertical transverse section taken along line 5—5 of FIG. 4 showing the reflecting element in position to provide one intensity reflection, FIG. 6 is a similar view taken along line 6—6 of FIG. 4 showing the reflecting element adjusted to a position to provide another intensity reflection, FIG. 7 is a perspective view of a portion of the spring hinge plate, and FIG. 8 is an exploded perspective view showing the various parts of the actuating mechanism in disassembled relation.

Referring now to the drawings and patricularly to FIGS. 1, 2 and 3, the mirror 20 comprises a case 21, a reflecting mirror element or panel 22 closing the front of the case, a housing 23 secured to the back of the case, and an actuating mechanism 24 mounted in said housing in cooperative engagement with a support arm fixed to the vehicle and actuatable by manipulation of a finger piece or lever 25 projecting out of the lower edge of the housing to tilt or pivot the reflecting mirror element and the housing as a unit to position the mirror element in either a high intensity reflection or lower intensity reflection position with respect to the vehicle.

The case 21 is molded from a suitable plastic material, such as a vinyl plastic, and comprises a substantially flat base member 26 having a forwardly directed peripheral flange 27 which extends entirely around the base member and terminates in an inturned lip 28 to form a groove 29 within which the mirror element 22 is received, with the said lip 28 overlapping the front face of the mirror element as shown in FIGS. 5 and 6.

The rear surface of the base member 26 of case 21 is formed with a depressed or recessed area 30 intermediate the ends thereof in which the housing 23, containing the mirror element actuating means 24, is secured. The housing 23 is also molded of a relatively soft plastic material, such as vinyl plastic, and comprises a flat rear wall 31 having forwardly directed top and bottom walls 32–33 and forwardly angled end walls 34–35, said top and bottom walls and end walls terminating in a flat rim 36 extending circumferentially of the housing but being relatively wider at the opposite ends than along the top and bottom thereof. The rim 36 is snugly received in the recessed area 30 in the base member 26, as shown in FIG. 3, and is secured to the base member 26 preferably by heat sealing.

The assembled actuating mechanism 24 is mounted in the housing 23 upon the inner end of a support member 37 which extends through an opening 38 in the rear wall 31 of housing 23 and is provided at its rear end with a stud ball 39 suitably rigidly coupled to an automobile in the usual way.

More particularly, the support member 37 comprises a cylindrical stem 40, the outer end of which carries the stud ball 39 while the inner end is formed with a disk 41 and a substantially rectangular boss 42 for supporting a bracket member 43. The bracket member 43 comprises a substantially rectangular plate 44 having an opening 45 substantially conerally thereof of the same shape as the boss 42 and receiving the same therethrough when the bracket member is in assembled position.

The bracket member 43 is formed at its lower edge with spaced downwardly projecting integral extensions 46–47 which curve forwardly and then rearwardly to provide substantially semi-circular gripping fingers. The plate 44 is also provided adjacent its opposite ends with openings 48–49 which receive rivets or the like 50–51, for a purpose to be more fully hereinafter described.

The finger lever 25 is part of an operating member 52 and is carried at the outer end of a stem 53, the inner end of which is integral with a horizontally disposed rocking cam 54 supported by horizontal trunnions 55 and 56.

When in assembled position, the stem 53 projects through a horizontal transverse slot 37 in the bottom wall 33 of the housing 23, and it will be noted that this slot connects with a vertical slot 58 in the rear wall of the housing so that upon rocking of the cam 54 the stem 53 can swing between a vertical position as in FIG. 6 and a horizontal position as in FIG. 5.

In assembling the actuating mechansim, the operating member 52 is mounted in the housing 23, with the stem 53 projecting downwardly through the slot 57. The bracket member 43 is then fitted onto the boss 42 and suitably secured thereto such as by peening the end of the boss. When so positioned, the trunnions 55–56 of operating member 25 will be received in and supported by the curved fingers 46–47 while the cam 54 will engage the back wall 31 of the housing as shown in FIG. 6.

Disposed forwardly of the bracket member 43 is a spring hinge member 59 comprising a substantially rectangular body portion 60 having formed integral therewith a depending forwardly bowed apron 61 cut out as at 62. The opposite ends of the body portion 60 of hinge member 59 are turned rearwardly as at 63–64 and terminate in outwardly directed flanges 65–66 provided with openings 67–68 respectively.

The flanges 65–66 project above the body portion 60 and are formed with forwardly directed spring ears 69–70 provided with openings 71–72 respectively. The ears 69–70 are also provided with arcuate slots 73–74 which contribute additional resiliency to the ears when deflected along the hingle lines 75–76 at the juncture of the ears and the flanges 65–66. As shown in FIG. 7, the ears 69–70 are preferably disposed at an angle of from about 3° to 5° relative to the flanges 65–66 for a purpose to be more fully hereinafter described.

After the operating member 52 and bracket member 43 have been assembled as described above, the hinge member 59 is positioned against the bracket member 43, with the flanges 65–66 in contact therewith and secured thereto by the rivets 50–51 which pass through the openings 48–49 in the bracket member 43 and the aligned openings 67–68 in the flanges 65–66 to firmly secure the bracket member and hinge member together.

When assembling the hinge member 59, the lower end of the depending apron 61 is inserted in a groove formed between the spaced ribs 77–78 integral with the bottom wall 33 of the housing. The hinge member is also secured to the top wall 32 of the housing by rivets, or the like 79–80 passing through openings 81–82 in said top wall and through the openings 71–72 in the spring ears 69–70 of the hinge member.

The mirror element 22 is fitted in the groove 29 of the case 21 and lies flat against the base member 26. The mirror element is prismoidal in cross section as shown in FIGS. 5 and 6, and comprises a transparent wedge-shaped glass plate 83 having a suitable type reflecting coating 84 applied to the rear surface thereof.

In operation of the mirror, the stem 40 and stud ball 39 remain rigid with respect to the automobile to which it is mounted, as does also the bracket member 43 which is fixed to the boss 42. Upon movement of the finger lever 52 between the horizontal position in FIG. 5 and the vertical position in FIG. 6, the mirror element 22 can be adjusted from one reflecting position to another reflecting position to provide the desired high intensity reflection or a lower intensity reflection.

More particularly, when the mirror is used for day driving it is ordinarily disposed in the substantially vertical position shown in FIG. 5, with the finger lever 52 in a substantially horizontal position in the slot 58 in the back wall of the housing 23 and the cam 54 out of engagement with said back wall of the housing. When it is desired to adjust the mirror for night driving, the finger lever 52 is moved to the vertical position shown in FIG. 6, whereupon the cam 54 engaging the back wall 31 of housing 23 will force the lower end of the housing rearwardly, causing it to tilt forwardly and downwardly to position the mirror element 22 as shown in FIG. 6. During such tilting movement the bracket member 43 will remain in a fixed position relative to the stem 40 and stud ball 39, while the hinge member 59 will be caused to pivot about the hinge defined by the hinge lines 75–76. At the same time, the depending apron 61 will be placed in tension as also shown in FIG. 6.

When it is desired to return the mirror to day driving position, the finger lever 52 is moved rearwardly into the slot 58 and the cam 54 moved away from the back wall of the housing, whereupon the spring action of the hinge member 59 will cause the housing and mirror element to automatically return to the position shown in FIG. 5, due to the flexing of the ears 69–70 along the hinge lines 75–76. In other words, when the mirror is tilted to the position in FIG. 6, the housing is spring biased and will be returned to vertical position by the hinge member when the cam is moved away from the rear wall of the housing. This return action is facilitated by disposing the spring ears 69–70 at a slight angle relative to the flanges 65–66 as shown in FIG. 7 so that there is a small space between the inner ends of the ears and the top wall of the housing. When the housing moves to its substantially vertical position the depending spring apron 61 will be extended forwardly, due to the restraining of the lower edge thereof as in FIG. 5, and thereby placed in added tension to assist in preventing undesirable vibration of the mirror. Thus, as the finger lever 52 is moved from one position to another the housing pivots relative to stem 40, thereby changing the angle of reflection of mirror element 22 and its reflective intensity to the driver of the vehicle.

As brought out above, the case 21 of the mirror including the base member 26 and the housing 23 are molded of a relatively soft plastic material, such as vinyl plastic, and the fact that the edges of the mirror element are covered by the plastic will present less liability to injury of the driver or passengers upon impact. Although the housing 23 is shown in FIGS. 2 and 3 as extending over the central area only of the base member 26 of the case, it will be appreciated that the housing may be longer, if desired, and in fact can cover substantially the entire area of the base member if preferred. By making the housing longer added resistance against breakage would be imparted to the end portions of the mirror.

It is to be understood that the form of the invention herewith shown and described is to be taken as a preferred embodiment of the same, and that various changes in the shape, size and arrangement of parts may be resorted to without departing from the spirit of the invention.

We claim:

1. In a multiple position rear view mirror for vehicles, a case including a base member, a mirror element carried by said base member at the front thereof, a housing at the back of said base member having a rear wall, top and bottom walls and end walls, a support member passing through an opening in the rear wall of said housing and adapted to be secured in fixed relation to a vehicle, actuating mechanism received in said housing comprising a bracket member fixed to said support member, a hinge member having end portions secured to said bracket member and forwardly directed ears integral with the upper ends of said side portions and forming therewith a hinge at the juncture thereof, means for securing said ears to the top wall of the housing, said hinge member being provided with a depending forwardly bowed spring apron, and the bottom wall of the housing being provided with means forming a groove for receiving the lower end of the spring apron therein to restrain movement of said end upon tilting of the housing and mirror element, a cam located between said bracket member and the rear wall of the housing, spaced depending fingers carried by said bracket member, trunnions carried by said cam rockably supported by said fingers, said housing being provided with a transverse slot in the bottom wall and rear wall thereof, and an operating member including a stem carried by said cam and projecting through said slot, a finger lever at the outer end of said stem manually operable to rock said cam in one direction to engage the rear wall of the housing thereby causing a flexing of the forwardly directed ears to tilt said housing and mirror element in one direction, said housing and mirror element being automatically returned by reverse flexing of said ears to initial position when the cam is moved away from said rear wall.

2. In a multiple position rear view mirror for vehicles, a case including a base member, a mirror element carried by said base member at the front thereof, a housing secured behind said base member and having a rear wall and a cavity facing said base member, a support member extending through an opening in said rear wall with means at the outer end thereof adapted to be secured to a vehicle, and an actuating mechanism within said cavity comprising a bracket member fixed to said support member, a spring hinge member secured at an intermediate section thereof to said bracket member and at the upper and lower ends thereof to said housing, said spring hinge member urging said housing rear wall toward said bracket member and having hinge lines about which said housing is adapted to pivot, and cam means supported for rocking movement between said housing rear wall and said bracket member, said cam means being movable back and forth between a first position, whereat the cam surface thereof engages said rear wall to hold said housing and mirror element at a first reflecting position, and a second position whereat said cam surface permits said rear wall to pivot toward said bracket member and move said housing and mirror element into a second reflecting position.

3. A multiple position rear view mirror for vehicles as claimed in claim 2, in which said hinge member is secured at its lower end to said housing by means of a groove extending longitudinally along the bottom wall of said housing in which the lower end of said hinge member is received.

4. In a multiple position rear view mirror for vehicles as defined in claim 2, in which said bracket member is provided with a pair of spaced curved fingers and said cam is supported by trunnions engaging said fingers.

5. In a multiple position rear view mirror for vehicles as defined in claim 2, in which said housing is provided with a rear wall, top and bottom walls and end walls, and in which said hinge member is provided with spring ears secured to said top wall.

6. In a multiple position rear view mirror for vehicles as defined in claim 2, in which a finger lever is secured to said cam and projects through a transverse slot in the bottom wall and rear wall of the housing, said finger lever being movable rearwardly and forwardly within said slot to adjust the housing and mirror element from one position to another.

7. In a multiple position rear view mirror for vehicles as defined in claim 2, in which said base member and housing are formed of a molded plastic material and said base member is provided with a peripheral flange fitting around the edge of the mirror element and overlapping the front face thereof.

8. In a multiple position rear view mirror for vehicles as defined in claim 7, in which the back of the base member is provided with a recessed area and said housing is provided with a rear wall, forwardly directed top and bottom walls and opposite end walls terminating in a peripheral flange, said peripheral flange being received in said recessed area and secured to said base member.

References Cited

UNITED STATES PATENTS

| 2,900,872 | 8/1959 | Mazur et al. | 350—281 |
| 3,253,510 | 5/1966 | Clayton et al. | 350—281 |

PAUL R. GILLIAM, Primary Examiner

U.S. Cl. X.R.

350—279